April 21, 1970 L. EAGLE 3,507,517
TRACTOR-TRAILER ANTIJACKKNIFING DEVICE
Filed April 30, 1968 2 Sheets-Sheet 1
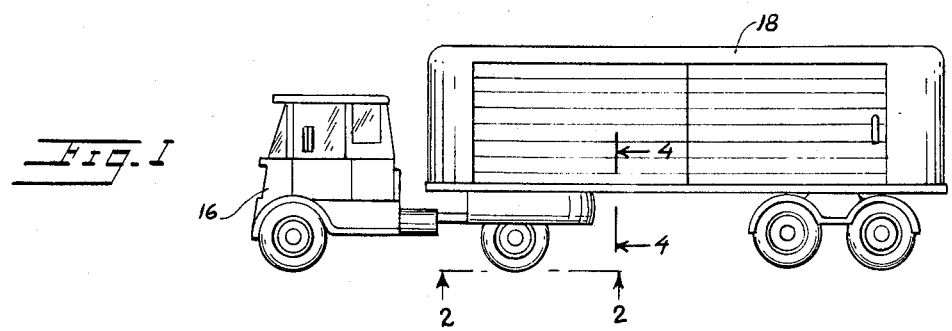
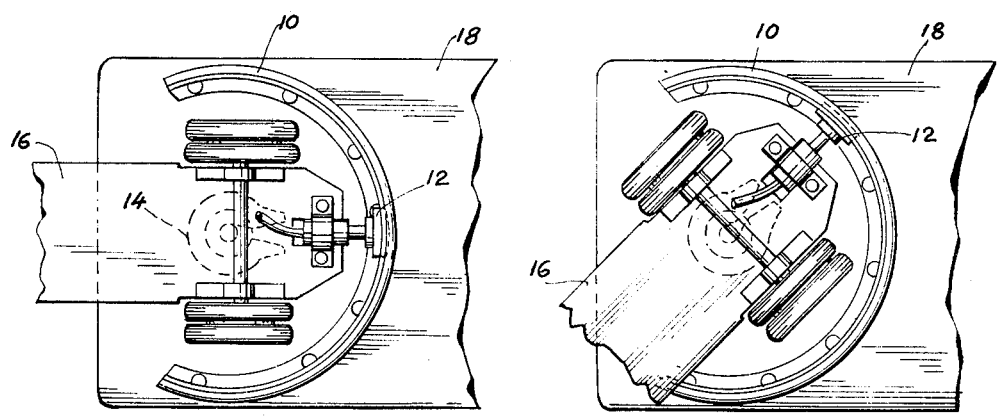
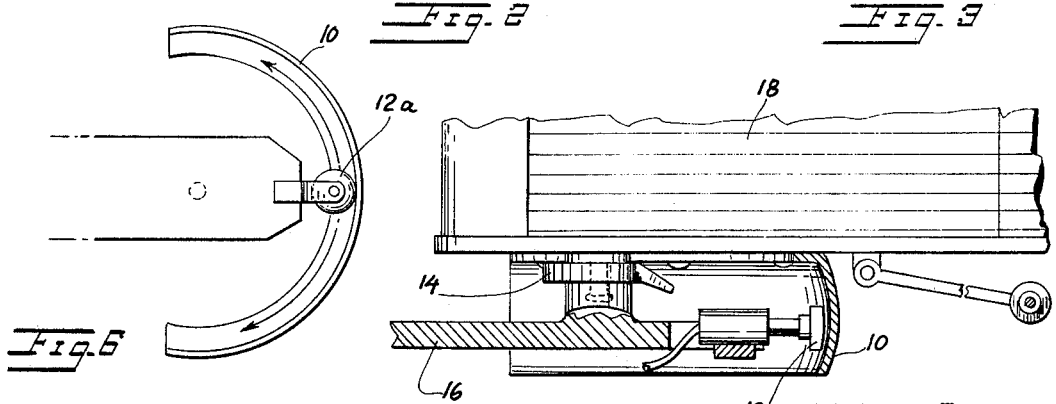
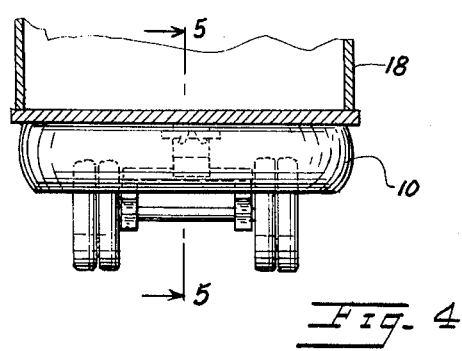
INVENTOR.
LEO EAGLE
BY
ATTORNEYS April 21, 1970   L. EAGLE   3,507,517
TRACTOR-TRAILER ANTIJACKKNIFING DEVICE
Filed April 30, 1968   2 Sheets-Sheet 2

INVENTOR.
LEO EAGLE
BY
ATTORNEYS

United States Patent Office 3,507,517
Patented Apr. 21, 1970

3,507,517
TRACTOR-TRAILER ANTIJACKKNIFING DEVICE
Leo Eagle, 17 Tad Lane, Old Bethpage, N.Y. 11714
Filed Apr. 30, 1968, Ser. No. 725,365
Int. Cl. B62d 53/06
U.S. Cl. 280—432     5 Claims

ABSTRACT OF THE DISCLOSURE

A device for preventing changes in angle between a tractor and its trailer progressively actuated in proportion to braking action consisting of an engaging member and an engaged member, the engaging member being in fluidic communication with the main braking system of the vehicle such that as the brakes are applied, the engaging member progressively engages the engaged member. As one member is mounted on the tractor and the other member mounted on the trailer such engagement prevents changes in angle between the tractor and the trailer.

BACKGROUND OF THE INVENTION

Field of the invention

Antijackknifing devices for tractor-trailer combinations.

Description of the prior art

Because the danger of jackknifing is very real and because its consequences are so dangerous, many attempts have been made in the past to prevent jackknifing occurrences. Prior patents known to the applicant are Huffman et al., U.S. Patent No. 2,146,145 and Young et al., U.S. Patent No. 2,550,632. Huffman et al. is merely a limiting device integral with the tractor-trailer coupling means to prevent the tractor from turning beyond a predetermined angle relative to the trailer and is primarily useful in parking maneuvers. Young et al. is an antitelescoping device which serves to prevent the trailer from telescoping forward upon the tractor after, in extreme circumstances, the "fifth wheel" coupling device fails. Neither patent discloses any way of progressively reducing a change of angle between the tractor and the trailer.

SUMMARY OF THE INVENTION

Accordingly, the present invention provides a device which eliminates jackknifing under emergency stopping conditions of a tractor-trailer combination.

The present invention also provides a safety device which is automatically and progressively utilized in direct proportion to the braking force exerted by the standard or service brakes of the tractor-trailer combination.

Basically, and not by way of limitation, the present invention comprises an engaging member which is in fluidic communication with the service brakes of the tractor-trailer and an engaged member which is adapted to be engaged by the engaging member. One of the members is mounted on the tractor and the other is mounted on the trailer such that full engagement of the one with the other serves to lock the tractor-trailer combination at an angle, and prevents changes in that angle.

The engaged member is a rail suitably curved with respect to the engaging member. The engaging member may simply be a piston-mounted friction surface. In effect the engaging member is a brake shoe and the engaged member a brake drum acting in the conventional manner to retard rotation of the one about the other. The shoe is connected to the service brake fluid (whether liquid or gas) such that application of the service brakes actuates the shoe and retards a change of angle between the tractor and the trailer. As the service brakes are progressively applied, the engaging shoe is progressively applied and the change in angle between the tractor and the trailer progressively retarded.

BRIEF DESCRIPTION OF THE DRAWING

FIGURE 1 is a side view of a tractor-trailer combination showing the anti-jackknifing device of the present invention mounted thereon.

FIGURE 2 is a fragmentary bottom view, partly in phantom, of the tractor-trailer combination of FIGURE 1 showing details of anti-jackknifing devices. The view is across line 2—2 of FIGURE 1.

FIGURE 3 is a view similar to that of FIGURE 2 but showing a different angular relation between the tractor and the trailer.

FIGURE 4 is a fragmentary view, partly in phantom, across line 4—4 of FIGURE 1.

FIGURE 5 is a fragmentary view, partly in phantom, across line 5—5 of FIGURE 4.

FIGURE 6 is a view of a modified form of the anti-jackknifing device of the present invention.

DESCRIPTION OF PREFERRED EMBODIMENTS OF THE INVENTION

Figure 7:
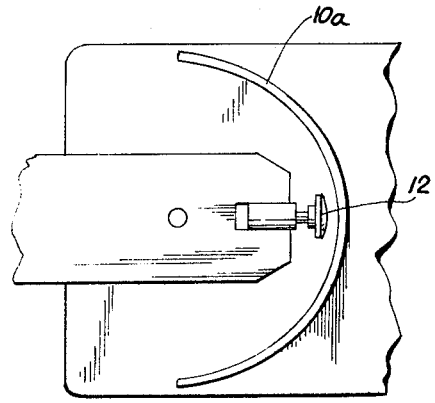
FIGURE 7 is a view of another modified form of the present invention.

Referring to the drawing, the tractor-trailer anti-jackknifing device of the present invention comprises an engaged member or rail 10 mounted on trailer 18 and which in plan view (FIGURES 2 and 3) is an arc of a circle concentric with the vertical pivot axis of the fifth wheel 14. The fifth wheel, of course, is the standard coupling device between tractors and trailers.

The engaging member 12 is similar to a brake shoe and compirses a friction surface mounted on a piston which is actuated by the standard, or service, brake system of the vehicle. Engaging member 12 is mounted on the chassis at the rear of the tractor 16 and is adapted for engagement with engaged member 10.

Operation of the tractor-trailer anti-jackknifing device of the present invention is completely automatic and does not require conscious driver actuation. As the operator slows his vehicle by applying the service brakes, engaging member 12 is projected rearwardly of tractor 16 and engages rail 10. With a light application of the service brakes, as when slowing to enter a curve, engaging member 12 lightly touches rail 10 and hardly impedes a change of angle between tractor 16 and trailer 18. If, however, the service brakes are applied more rigorously, as would be the case under emergency conditions, engaging member 12 engages rail 10 in proportion to the braking force and therefore impedes but does not prevent the change of angle between tractor 16 and trailer 18. Accordingly, there is little likelihood that jackknifing will occur. In dire circumstances when the service brakes are applied most abruptly and emphatically (the condition most likely to cause jackknifing) engaging member 12 secures against rail 10 and prevents any change of tractor-trailer angle.

Operation of the present invention as shown in FIGURES 2 and 3 will remain the same not withstanding the initial angle between tractor 16D and trailer 18 because rail 10 describes an arc equidistant from engaging member 12 for all tractor-trailer angles.

In cross-section rail 10 describes an arc concentric with the horizontal pivot axis of fifth wheel 14. Rail 10 is accordingly, in the first form of the invention, an arc of rotation about the vertical pivot axis.

In the second form of the invention as shown in FIGURE 6 a rotating member 12a in constant engagement with rail 10 replaces shoe engaging member 12. Rotating member 12a has a conventional internal brake shoe and drum arrangement which is actuated by the service brakes to retard rotation.

Figure 8:
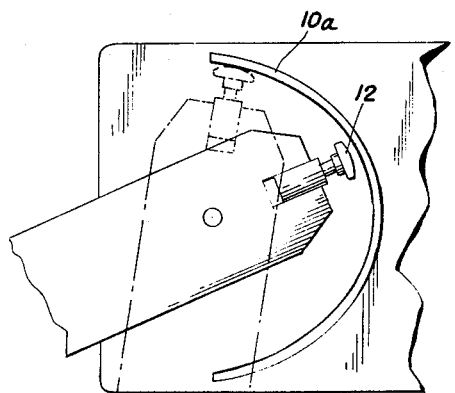
FIGURE 8 is a view, partly in phantom, of the modified form of the invention shown in FIGURE 7.

A third embodiment of the present invention, FIGURES 7 and 8, provides the shoe type engaging member 12 of the first form hereof and provides a rail 10a which is not circular but which has a reduced radius of curvature at its ends. The larger radius of curvature at its center portion provides ample clearance for engaging member 12 but the reduced ends serve to increase contact with engaging member 12 and thereby retard excessive changes of tractor-trailer angle.

Figure 9:
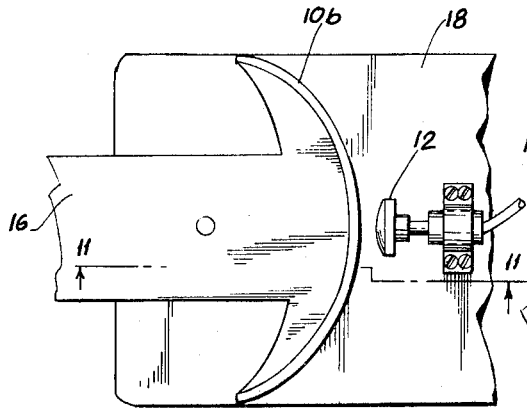
FIGURE 9 is a view of a further modified form of the present invention.
Figure 10:
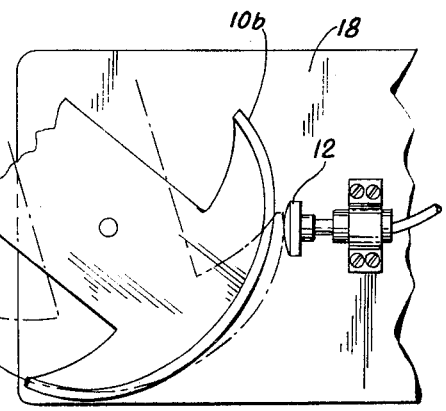
FIGURE 10 is a view, partly in phantom, of the modified form of the invention shown in FIGURE 9.
Figure 11:
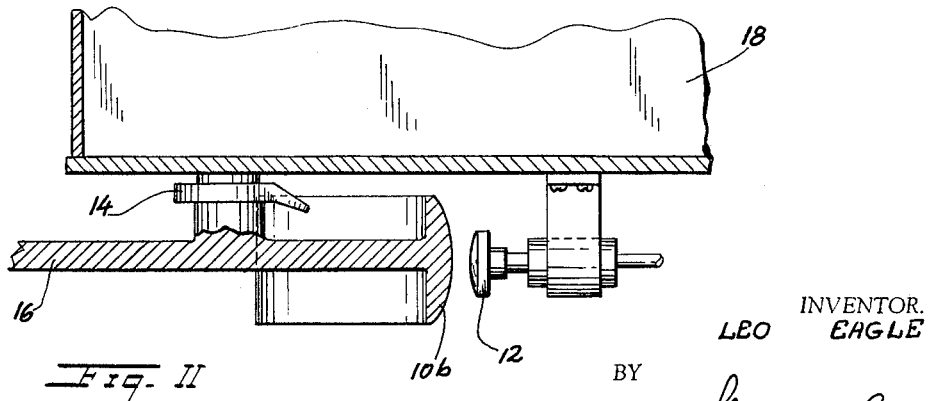
FIGURE 11 is a fragmentary cross-sectional view taken across line 11—11 of FIGURE 9.

The fourth embodiment of the present invention, FIGURES 9 and 10, reverses the positions of the engaging and engaged members. Accordingly, engaging shoe 12 is mounted on trailer 18 facing forwardly to engage rail 10b which is mounted at the rear of tractor 16. Other limitations would apply. For example, in plan view rail 10b would be arcuate and concentric with the vertical pivot axis of fifth wheel 14. In cross section, rail 10b would be arcuate and concentric with the horizontal pivot axis of fifth wheel 14. In this form of the invention there is the least likelihood of foreign matter clogging the rail and crippling operation of the device.

While the foregoing is illustrative of preferred embodiments of the invention it is clear that other embodiments, forms and modifications may be had within the teachings hereof. Limiting statements should be construed broadly. For example, arcs described as being circular should be taken as being substantially so. For another example, arcs described as being concentric with an axis should be taken as substantially so. As a further example, the engaged rail 10b of the fourth embodiment hereof may not be circular, but have its ends farther from the central pivot axis than its central portion to permit automatic engagement as the tractor-trailer angle changes from parallel alignment (180°).

What is claimed is:

1. A tractor-trailer antijackknifing device, comprising:
 (a) an engaging member, said engaging member being in fluidic communication with and actuated by the main braking system of the vehicle; and
 (b) an engaged member, said engaged member being adapted to be engaged on its outer surface by said engaging member to prevent relative angular movement between said engaging member, said engaged member defining an arc of varying radius, the radii of curvature at the ends of which are more than the radius of curvature between its ends.

2. A tractor-trailer antijackknifing device, comprising:
 (a) an engaging member, said engaging member being in fluidic communication with and actuated by the main braking system of the vehicle; and
 (b) an engaged member, said engaged member being adapted to be engaged on its inner surface by said engaging member to prevent relative angular movement between said engaging member, said engaged member defining an arc of varying radius, the radii of curvature at the ends of which are less than the radius of curvature between its ends.

3. A tractor-trailer antijackknifing device in accordance with claim 2, wherein said engaging member is mounted upon the tractor and said engaged member is mounted on the trailer.

4. A tractor-trailer antijackknifing device in accordance with claim 2, wherein said engaging member is mounted on the trailer and said engaged member is mounted on the tractor.

5. A tractor-trailer antijackknifing device in accordance with claim 2, wherein said engaging member comprises a brake shoe.

References Cited

UNITED STATES PATENTS

| 2,667,364 | 1/1954 | Colpo. | |
| 2,804,314 | 8/1957 | Billingsley | 280—432 |
| 3,002,767 | 10/1961 | Gresko | 280—438 X |
| 3,063,739 | 11/1962 | Davies | 280—438 |
| 3,297,340 | 1/1967 | Rendessy | 280—432 |

FOREIGN PATENTS 8,873  9,1956  Germany.

GEORGE E. A. HALVOSA, Primary Examiner

U.S. Cl. X.R.

188—3